US006237902B1

(12) United States Patent
Lindström

(10) Patent No.: US 6,237,902 B1
(45) Date of Patent: May 29, 2001

(54) SHOCK ABSORBER DEVICE FOR A VEHICLE WHEEL SUSPENSION

(75) Inventor: Kent Lindström, Lerum (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/297,261

(22) PCT Filed: Oct. 23, 1997

(86) PCT No.: PCT/SE97/01769

§ 371 Date: Jun. 8, 1999

§ 102(e) Date: Jun. 8, 1999

(87) PCT Pub. No.: WO98/18640

PCT Pub. Date: May 7, 1998

(30) Foreign Application Priority Data

Oct. 28, 1996 (SE) .................................................. 9603933

(51) Int. Cl.[7] .................................................. B60G 17/00
(52) U.S. Cl. .................................. 267/64.16; 267/64.21; 267/122; 188/322.19
(58) Field of Search .............................. 267/64.16, 64.21, 267/64.24, 64.26, 64.17, 64.19, 64.27, 122, 256; 188/322.19, 322.22

(56) References Cited

U.S. PATENT DOCUMENTS

| 3,014,714 | * | 12/1961 | Trevaskis | 267/64.21 |
|---|---|---|---|---|
| 3,363,894 | | 1/1968 | Hill . | |
| 3,372,919 | | 3/1968 | Jackson . | |
| 4,206,907 | * | 6/1980 | Harrod | 267/64.21 |
| 4,647,026 | * | 3/1987 | Siemann et al. | 267/64.15 |
| 4,899,853 | * | 2/1990 | Hummel | 188/269 |
| 5,615,756 | * | 4/1997 | Grundei et al. | 188/322.15 |

FOREIGN PATENT DOCUMENTS

| 29 20 185 | 12/1979 | (DE) . |
|---|---|---|
| 0 318 817 | 6/1989 | (EP) . |
| 0 738 839 | 10/1996 | (EP) . |
| WO 91/13776 | 9/1991 | (WO) . |

* cited by examiner

Primary Examiner—Robert J. Oberleitner
Assistant Examiner—Pamela J. Rodriguez
(74) Attorney, Agent, or Firm—Young & Thompson

(57) ABSTRACT

Shock absorber device comprising a shock absorber combined with an air spring, which shock absorber device is arranged for active suspension/shock absorbing in a wheel suspension of a vehicle. The shock absorber is surrounded by the air spring, and in the annular interspace between the shock absorber and the air spring there is arranged a piston and cylinder device likewise surrounding the shock absorber and which on the inside is connected to the shock absorber and on its outside is connected to the air spring. The piston of the piston and cylinder device is an annular piston which via an axial extension part is connected to a stabilizer joined to the wheel suspension.

10 Claims, 5 Drawing Sheets

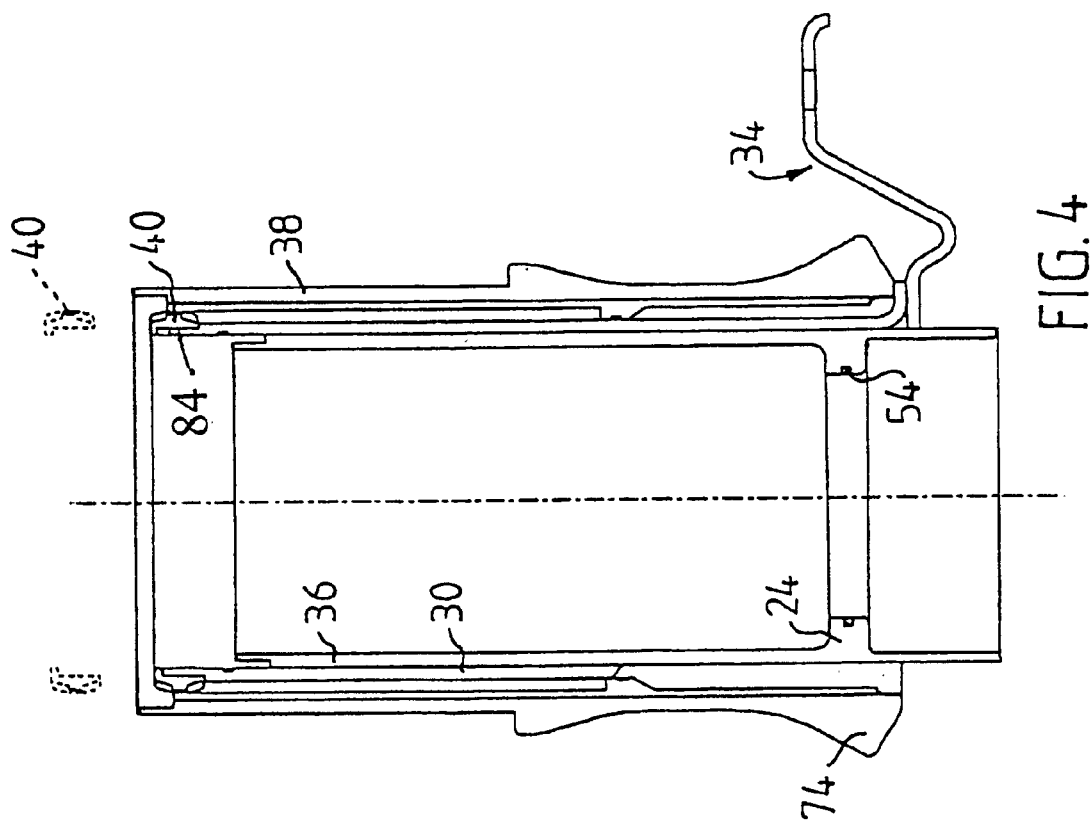
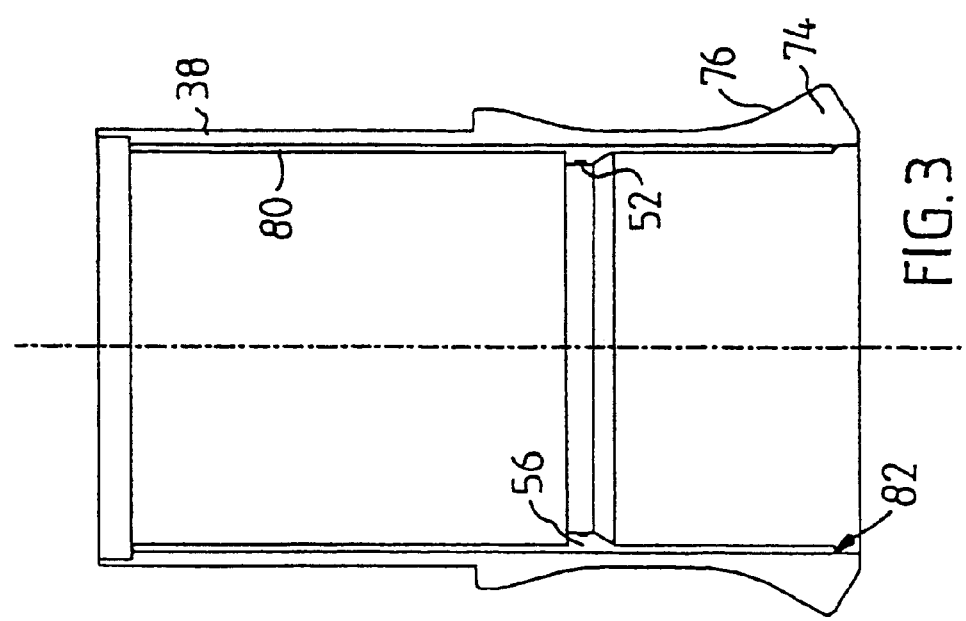

SHOCK ABSORBER DEVICE FOR A VEHICLE WHEEL SUSPENSION

CROSS REFERENCE TO RELATED APPLICATION

This is the 35 USC 371 national phase of International application PCT/SE97/01769 filed on Oct. 23, 1997 which designated the United States of America.

FIELD OF THE INVENTION

The invention relates to a shock absorber arrangement which comprises a shock absorber combined with a wheel suspension fitting and which is arranged for active wheel suspension/shock absorbing in a wheel suspension of a vehicle.

BACKGROUND OF THE INVENTION

In order to ensure good road characteristics and good travelling comfort (comfortable driving) for a vehicle equipped with wheels, such as an automobile, and in the special case of travelling on rough surfaces and when driving around bends, the vehicle must be provided with a well functioning system of wheel suspension, shock absorbers and springs. The springs provide elastic resistance through storing energy when they are pressed together, and this energy is damped away at least partially by means of shock absorbers which brake the relative movement between the bodywork of the vehicle and the wheel suspension and convert the spring energy to heat.

Especially between the front wheels of the vehicle, but sometimes also between its rear wheels, there is usually some type of stabilizer which prevents excessive rolling (leaning to the side) of the bodywork when driving around bends. A usual type of stabilizer is a twist or torsion spring in the shape of a torsion rod which is rotatably mounted to the car body/chassis/base plate and which extends transversely to the longitudinal axis of the car. The ends of the torsion rod are connected to the wheel suspension by lever arms and follow their suspension movements. With differently sized suspension movements of the wheels connected together through the stabilizer the stabilizer counteracts the leaning of the bodywork when driving around corners outwards in the curve and presses the inner, lighter loaded wheel against the road surface. The outer, more heavily loaded wheel at the same time gets stiffer springing which together leads to reduced lean and thereby improved road characteristics.

A wheel suspension system with active springs can regulate both the spring function and the damping function of the wheels. A plurality of different constructive solutions concerning such systems are known in the prior art. Sensors can be included in these systems which sense, for example, the vertical wheel load, the movement of the wheel and acceleration, respectively.

Signals from the sensors are normally transmnitted to an electronic control unit which controls and influences the characteristics of the constituent components in the wheel suspension system, such as springs, shock absorbers and stabilizers.

Thus it is previously known to combine shock absorbers and wheel suspension fittings to form a shock absorber/ spring unit, for example, in the shape of a hydraulic shock absorber with a surrounding helical spring (spiral spring) made of steel.

It is also known from the prior art to combine a stabilizer with a separate piston and cylinder device, which is arranged to, depending on at least one vehicle parameter, regulate the influence of the stabilizer on the wheel suspension system. Such a separate piston and cylinder device requires, however, for its mounting and in order to be able to perform its working movement, a not inconsiderable space in the vehicle. Near the rear axle the fuel tank is often in the way for such a device, and in the front of the vehicle the device must be placed under the engine which often is very problematic.

SUMMARY OF THE INVENTION

Quite generally, it must be stated that sufficient space for such a piston and cylinder device is not available in many of today's constructively compactly built motor vehicles, not least when it is a question of automobiles. A main object of the invention is therefore to provide a compact shock absorber arrangement for wheel suspensions in a vehicle, especially a motor vehicle of automobile type, where the spring effect, shock absorbing and stabilizing effect can be provided in a coordinated way with the help of a single constructively integrated unit. The main principle should thereby be that the unit is built up around the shock absorber which must in any case be given space in the region of the wheel suspension. The shock absorber arrangement according to the invention should also be so compact that it can find room at the front wheel of the vehicle as well as at its rear wheels.

A further object is that the shock absorber arrangement should be made so that the spring movement, shock absorber movement and the movement opposing leaning take place in the same direction, i.e. along a common line of action.

As is evident from the above, the shock absorber device should be so designed that it offers an effective means, which in a space-saving way is able to actively counteract leaning of the vehicle in question when it is driven through a curve.

Up to now, shock absorbers in combination with air springs have mainly been used in rear wheel suspensions but the shock absorber arrangement according to the invention through forming a constructively integrated unit can be used equally well in a front wheel suspension of a vehicle as in its rear wheel suspension. Air suspensions have in recent years become used more often because, among other things, they offer a soft vertical suspension and at the same time an improved travelling comfort. A disadvantage of air suspensions are, however, also that they lead to an increased susceptibility to leaning which is why special air suspensions should be combined with active lean-reducing measures so that the travelling comfort and the road-holding abilities should also be extremely good during cornering.

As a summary it could be said that the invention aims to offer a shock absorber arrangement with the same suspension characteristics the whole time, independent of the actual case of load of the vehicle, i.e. independent of the size of the load forces which influence, and which are to be absorbed by, the wheel suspension for the vehicle wheel in question.

The above mentioned object and therewith connected constructive problem is obtained and solved, respectively, according to the invention through a shock absorber arrangement having the characteristics stated in the claims.

Consequently, that which primarily distinguishes the shock absorber arrangement according to the invention is that the wheel suspension device is an air spring (an air cushion device) which surrounds the shock absorber itself, and in an annular space between the shock absorber and the air spring is mounted an annular piston and cylinder device which surrounds the shock absorber and which on the inside is connected to the shock absorber and on the outside is connected to the air spring. The piston in this piston and cylinder device is in this case an annular piston which is connected to a stabilizer belonging to the wheel suspension.

An important advantage of a shock absorber arrangement according to the invention is thus that, through forming a constructively integrated unit, it effectively avoids the building-in problems which follow with the mounting of the up to now known separate extra components for providing active shock absorbing with the use of pneumatic or hydraulic working cylinders cooperating with for example a stabilizer.

Preferred embodiments of the shock absorber arrangement according to the invention can furthermore have the characteristics stated in the dependent claims.

In one of the dependent claims it is stated especially how the piston and cylinder device suitably can be constructively designed so as to keep the outer dimensions of the device transversely (i.e. its diametric measurement) as low as possible.

BRIEF DESCRIPTION OF THE DRAWINGS

The invention will now be described more closely with reference to the embodiments shown in the accompanying drawings, wherein

FIG. 3 shows in axial longitudinal section the outer cylinder wall of the piston and cylinder arrangement according to the invention;

FIG. 4 shows in axial longitudinal section a stage of the mounting together of the piston and cylinder arrangement according to the invention;

DETAILED DESCRIPTION OF THE INVENTION

Figure 1:
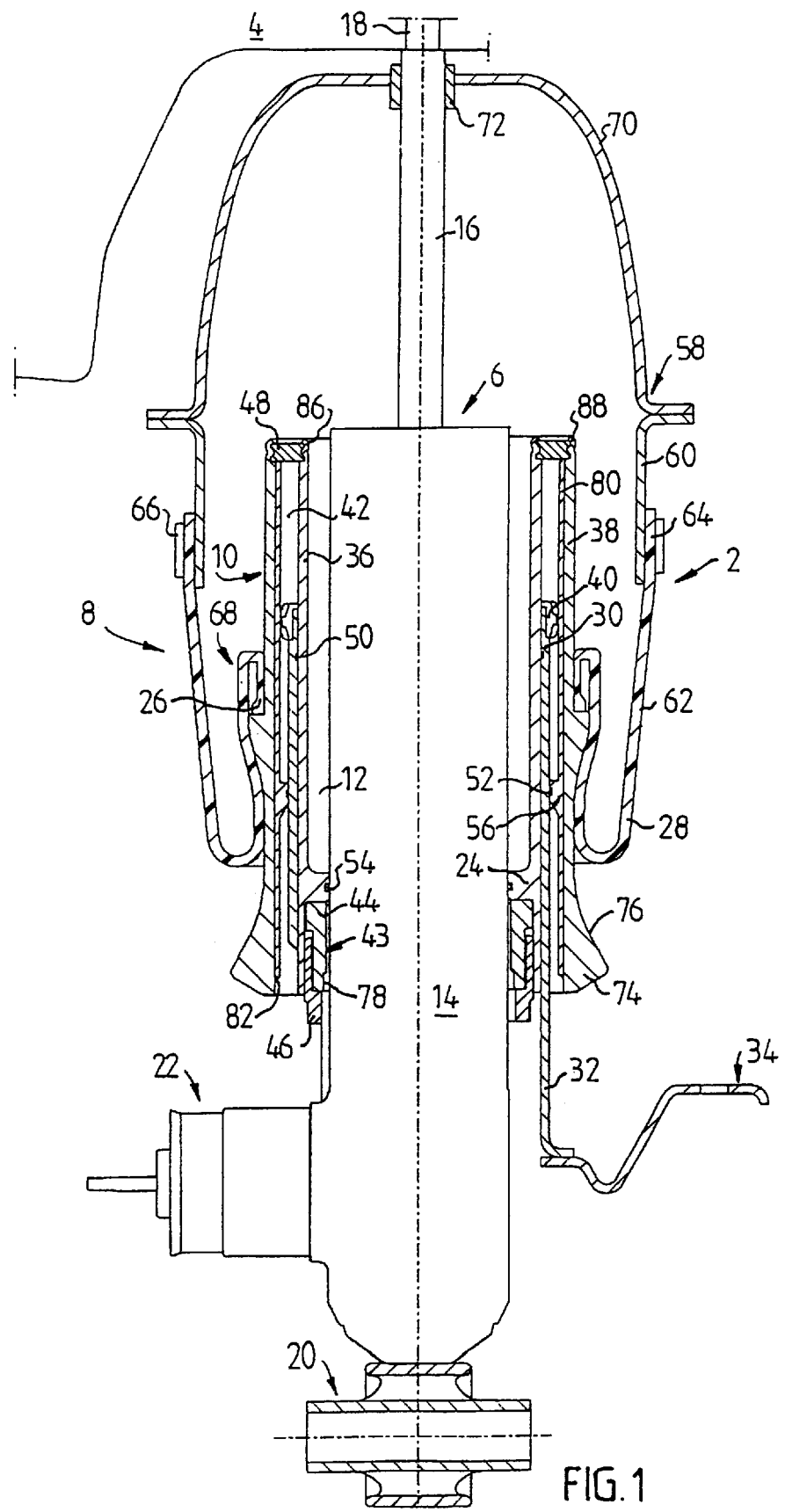
FIG. 1 shows in partially longitudinal section a shock absorber arrangement according to the invention.

FIG. 1 shows a shock absorber device 2 according to the invention. The shock absorber device is arranged for active suspension/shock absorbing in a wheel suspension of a vehicle of which the Figure only shows a part of a wheel house 4. The shock absorber device is intended to be mounted between the wheel house 4 and a (not shown) wheel supporting part for a vehicle wheel (not shown either), the suspension of which can be found in the wheel house 4. The shock absorber device 2 comprises three main components, namely innermost a hydraulic telescopic shock absorber 6, a shock absorber surrounding air spring 8, and a piston and cylinder device 10 likewise surrounding the shock absorber and arranged in the annular space 12 between the shock absorber 6 and the air spring 8. The hydraulic telescopic shock absorber 6 comprises a working cylinder 14 and a piston rod 16 projecting axially therefrom, the end part 18 of which via a (not shown) elastical resilient means, such as a rubber cushion, is fastened to the bodywork at the interior of the wheel house 4. At its lower end the working cylinder 14 is provided with a conventional attachment 20 by means of which the shock absorber is connected to a wheel-supporting part (not shown here). The shock absorber 6 has also at its lower part a load-sensing appd-valve 22 (air pressure proportional damper valve).

The inside of the annular-shaped piston and cylinder device 10 is connected via an annular supporting flange 24 to the cylinder house 14 of the shock absorber 6, and the outside of the piston and cylinder device 10 is in turn connected to an annular edge part 26 of the elastic lower part 28, formed as a roll membrane, of air spring 8. The piston and cylinder device 10 further comprises an axially forwardly and backwardly displaceable annular piston 30 from the lower end of which in the Figure there projects an axial extension piece 32, in the lower end of which there is fastened a bracket-like attachment 34 for a stabilizer (not shown here).

The piston and cylinder device 10 comprises, on one hand, a tubular inner cylinder wall 36, and, on the other hand, a tubular outer cylinder wall 38 which is coaxial with the cylinder wall 36 and arranged at a radial distance from the latter wall. The annular piston 30, which in its upper end is equipped with a piston ring 40, is axially displaceable in the annular cylinder space 42 between the inner cylinder wall 36 and the surrounding outer cylinder wall 38. The annular supporting flange 24 on the inside of the inner cylinder wall 36 is made in one piece with this cylinder wall. The supporting flange 24 lies in contact with an annular collar means 43 rigidly attached to the outside of the cylinder house 14 of the shock absorber 6, comprising two attachment nuts 44 and 46 screwed together. The upper edge parts of the cylinder walls 36 and 38 in the Figure are sealingly connected to each other via an annular cylinder head or top cover 48 along the circumferential edges of which the respective edge parts of the cylinder walls 36, 38 are crimped. The annular pressure seals 50, 52 and 54 are arranged in circumferential grooves on the inside of the annular piston 30, on the inside of the outer cylinder wall 38 and on the inside of the annular supporting flange 24. The circumferential groove for the pressure seal 52 is formed in the inwardly directed surface of an annular collar means 56 on the inside of the outer cylinder wall 38. The collar means 56 in contact with the outside of the annular piston 30 forms an end stop for the piston ring 40 of the annular piston 30 in its axial movement in the cylinder space 42.

The air spring with the general reference 8 comprises partly a pressure-holding, rigid housing 58, partly an elastic air bellows 62 of the roll membrane type sealingly connected to the lower annular end part 60 of the housing 58. The air bellows 62 has an upper edge part 64, which by means of a circumferential strap 66 is sealingly connected to the outside of the lower end part 60 of the pressure housing 58. The air bellows 62 has further an inner edge part 68 with a U-shaped cross-section, which through the inner part 26 is sealingly connected with the outside of the piston and cylinder device 10. This edge part 68 follows the piston and cylinder device in its spring movement in relation to the wheel house 4. The rigid pressure-retaining housing 58, which consists of the bell-shaped upper part 70 and the annular end part 60 welded thereto, is fastened by means of a ring flange 72 to the piston rod 16 of the shock absorber 6 fastened in the wheel housing 4.

Above the axial region or section between the fastening point of the air bellow part 68 and its end edge 74 facing towards the stabilizer, the outer cylinder wall 38 is provided on the outside with a circumferential outwardly concave rolling-up surface 76, which forms a support surface for the elastic lower membrane wall part 28 of the air bellows 62 formed as a roll membrane.

The piston and cylinder device 10 is part of a system for regulated active stabilizer damping and is a hydraulic device of which the hydraulic fluid flow is suitably controlled with the help of a special valve. The pressurized hydraulic fluid in the cylinder space 42 on the axially opposing sides of the piston ring 40 obtains its pressure from a hydraulic pump, which suitably can be a pump which is part of a servo control system of the steering arrangement of the vehicle.

To summarize, it should be emphasized that the shock absorber device 2 forms a constructively integral unit in which the air spring 8, the shock absorber 6 and the stabilizing piston and cylinder device 10 are integrated in an extremely space-saving way. A subcontractor can therefore manufacture the shock absorber device as an integrated complete unit and supply the same to a vehicle manufacturer completely ready for mounting in the vehicle in question, which is a considerable advantage for the vehicle manufacturer.

Figure 2:
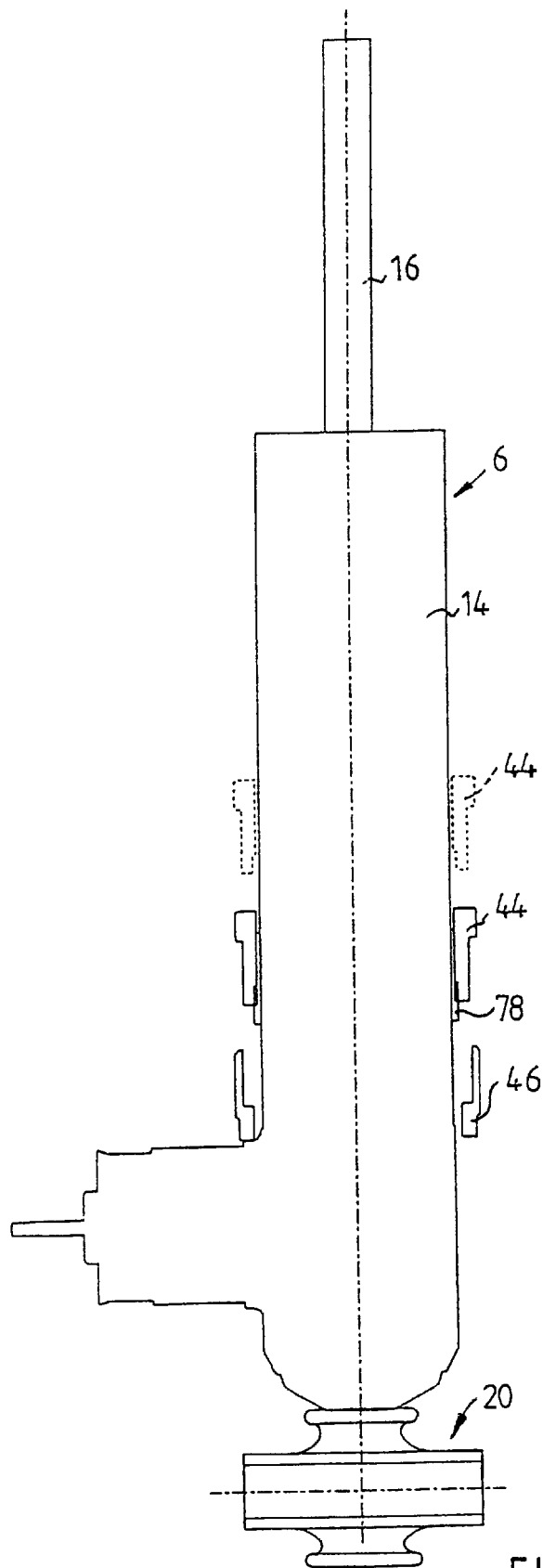
FIG. 2 shows in lateral view and in diametrical cross-section the shock absorber with associated fastening nuts constituted in the shock absorber device according to the invention.
Figure 7:
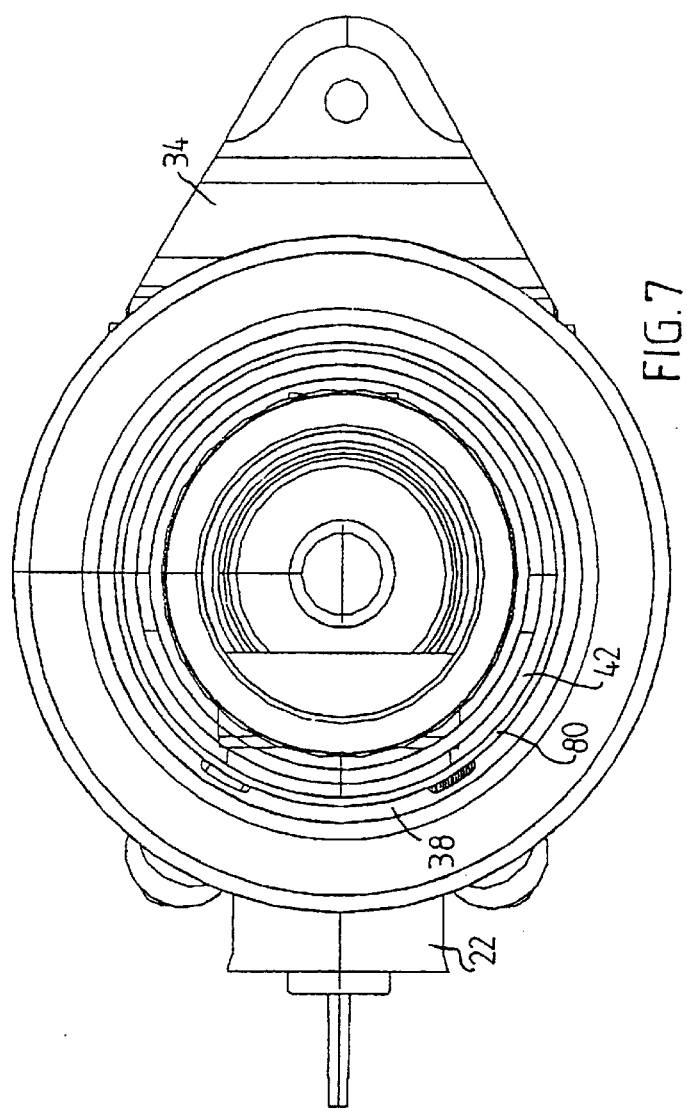
FIG. 7 shows in a larger scale a cross-section along the line A—A in FIG. 6.

FIG. 2 shows how the fastening nuts 44 and 46 are applied on the outside of the cylinder housing 14 of the shock absorber 6. The inner nut 44 is screwed on the outside of an externally threaded tubular casing 78 which is rigidly attached to the cylinder housing 14. Thereafter the outer nut 46 can, as is shown in more detail in FIG. 6, be screwed in an axial direction on the outside of the nut 44 which forms a position-fixing collar means for the piston and cylinder device 10.

FIG. 3 shows that the tubular outer cylinder wall 38 is provided with an internal cylinder liner casing 80 which is attached to the cylinder wall by means of a weld 82 in the region of the end edge 74.

FIG. 4 shows how the piston ring 40 is placed at the upper end edge of the annular piston 30 and then attached by means of a locking screw 84.

Figure 5:
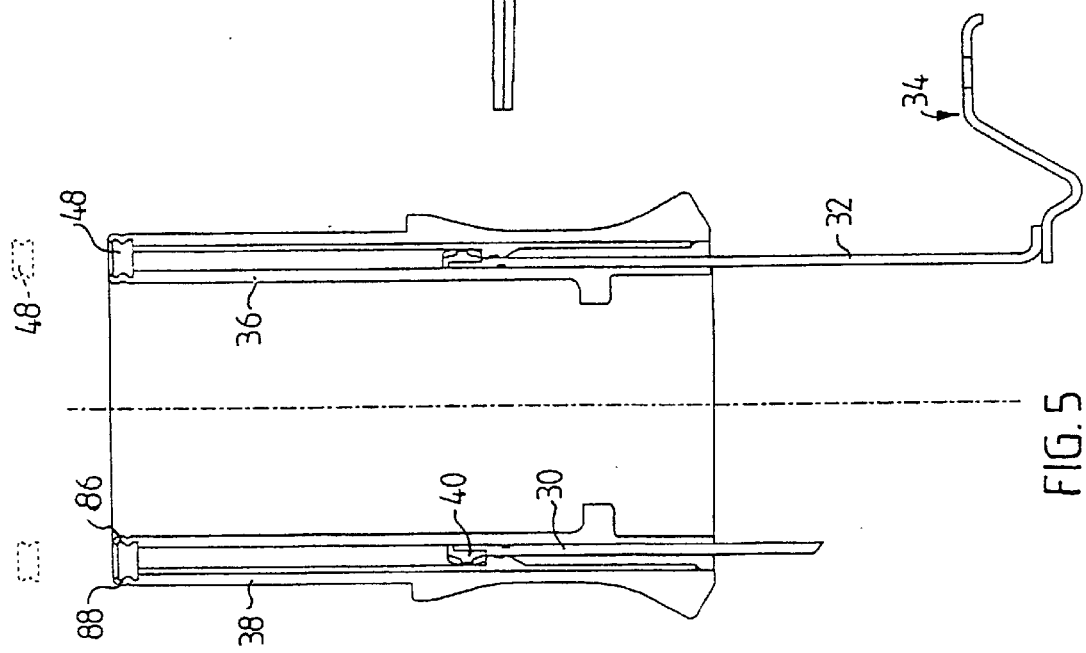
FIG. 5 shows in axial longitudinal section the final stage of the mounting together of the piston and cylinder device according to the invention.

FIG. 5 shows how the edge parts 86 and 88 of the inner cylinder wall 36 and the outer cylinder wall 38 are crimped over the inner edge and outer edge, respectively, of the annular cylinder head or top cover 48.

Figure 6:
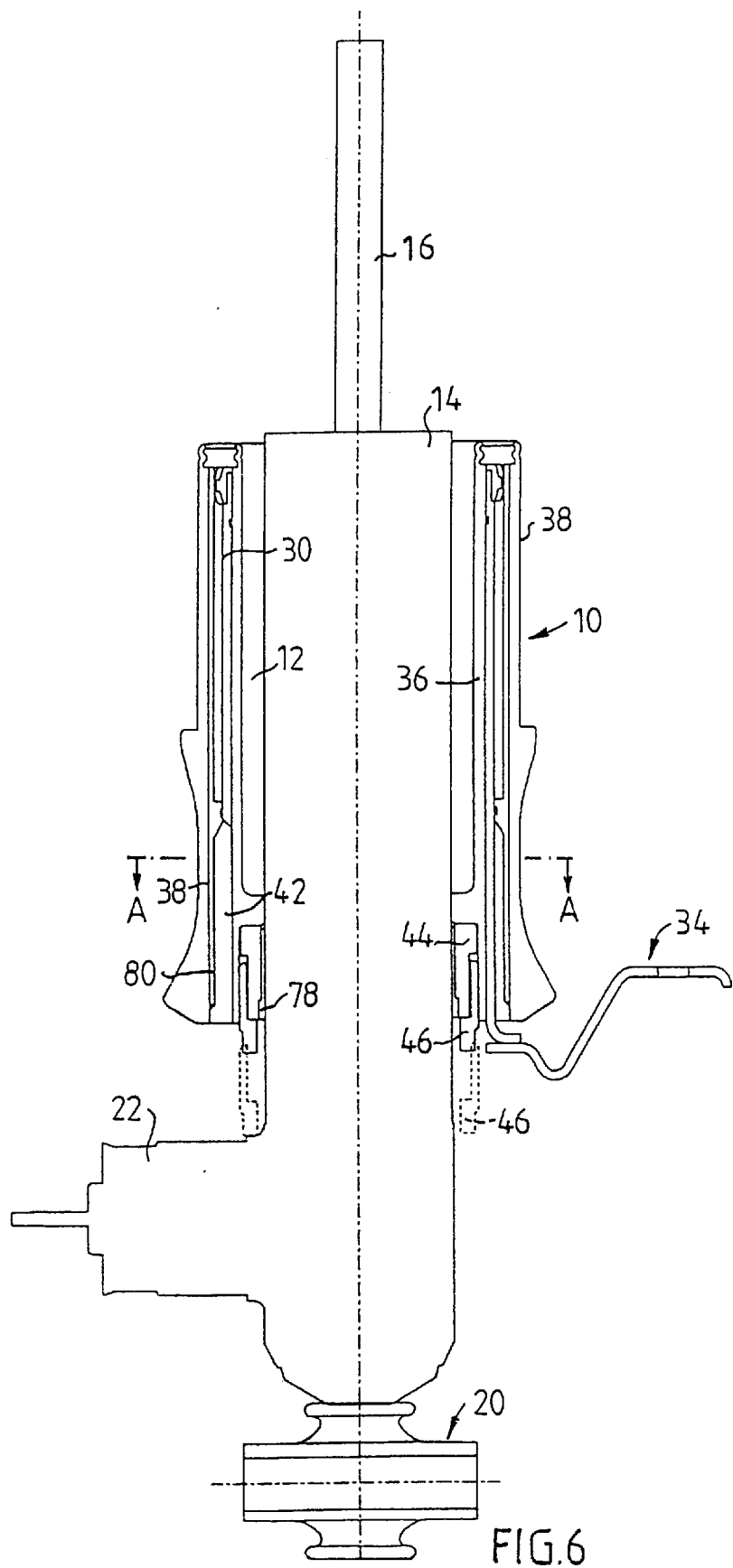
FIG. 6 shows in lateral view and axial longitudinal section the piston and cylinder device in fixed mounting position on the outside of the shock absorber, before the mounting of the surrounded air spring.

FIG. 6, finally, shows how the piston and cylinder device 10 mounted on the outside of the shock absorber 6 is fixed in the intended position through the outer nut 46 being screwed tight on to the inner nut 44. The annular piston 30 is in this case in its uppermost position in the cylinder space 42.

What is claimed is:

1. A shock absorber device comprising a shock absorber combined with a wheel suspension fitting; said shock absorber device being arranged for active suspension or shock absorbing in a wheel suspension of a vehicle; the wheel suspension fitting comprising an air spring surrounding the shock absorber; a piston and cylinder device surrounding the shock absorber and arranged in an annular space between the shock absorber and the air spring; said piston and cylinder device being connected to the shock absorber and to the air spring; and said piston being an annular piston and being connected to a stabilizer joined to the wheel suspension.

2. The shock absorber device according to claim 1, wherein the piston and cylinder device comprises partly a tubular inner cylinder wall which on the inside is provided with an annular support sealing against a shock absorber and fixed to an annular stop means rigidly attached on the outside of the shock absorber, partly a tubular outer cylinder wall, which is coaxial with and arranged at a radial distance from the inner cylinder wall and which is sealingly connected at its end facing towards a vehicle chassis, to an end adjacent to the inner cylinder wall, and the annular piston displaceable in a space between the cylinder walls is a tubular piston provided with a piston ring at its end facing towards the vehicle chassis.

3. The shock absorber device according to claim 2, wherein pressure seals are arranged a) between the outside of the inner cylinder wall and the inside of the annular piston, and b) between the inside of the outer cylinder wall and the outside of the annular piston.

4. The shock absorber device according to claim 3, wherein the outer cylinder wall is provided on the inside with an annular collar means, sealing towards the outside of the annular piston, and which forms an end stop for the piston ring of the annular piston.

5. The shock absorber device according to claim 2, wherein the air spring comprises partly a pressure-retaining, rigid housing, having an end part facing towards the vehicle chassis, attached to a piston rod of the shock absorber and fastened to the vehicle, partly an elastic air bellows, sealingly connected to the end part of the housing facing away from the vehicle chassis; said air bellows having an edge part sealingly connected to the outside of the piston and cylinder device and following the piston and cylinder device in its axial movement in relation to the vehicle chassis.

6. The shock absorber device according to claim 5, wherein the edge part of the air bellows connected to the piston and cylinder device is fastened on the outside of the outer cylinder wall, which above an axial section between a fastening point of the bellows edge part and an end edge of the bellows edge part facing towards the stabilizer, is provided on the outside with a circumferential, outwardly concave, when seen in diametrical section, rolling-up surface, for a membrane wall of the elastic air bellows formed as a roll membrane.

7. The shock absorber device according to claim 1, wherein the shock absorber is a telescopic shock absorber with a piston rod attached to the vehicle.

8. The shock absorber device according to claim 1, wherein the piston and cylinder device is part of a system for regulated active roll-damping and comprises a hydraulic device having a hydraulic fluid flow which is controlled by a priority valve; the hydraulic fluid receiving its pressure from a hydraulic pump comprised in a servo control system belonging to a steering system of the vehicle.

9. The shock absorber device according to claim 1, wherein the wheel suspension fitting, the shock absorber and the stabilizing piston and cylinder device are integrated into a constructively integral unit.

10. The shock absorber device according to claim 1, wherein the air spring comprises partly a pressure-retaining, rigid housing, having an end part facing towards a vehicle chassis, attached to a piston rod of the shock absorber and fastened to the vehicle, partly an elastic air bellows, sealingly connected to the end part of the housing facing away from the vehicle chassis; said air bellows having an edge part sealingly connected to the outside of the piston and cylinder device and following the piston and cylinder device in its axial movement in relation to the vehicle chassis.

* * * * *